United States Patent [19]
Szmidt et al.

[11] Patent Number: 5,791,085
[45] Date of Patent: Aug. 11, 1998

[54] POROUS SOLID MATERIAL

[75] Inventors: Robert Aleksander Karasinski Szmidt, Ayr; Neil Bonnette Graham, Glasgow, both of Great Britain

[73] Assignee: University of Strathclyde, Glasgow, United Kingdom

[21] Appl. No.: 904,818

[22] Filed: Aug. 1, 1997

Related U.S. Application Data

[63] Continuation of Ser. No. 736,026, Oct. 23, 1996, abandoned, which is a continuation of Ser. No. 356,279, filed as PCT/GB93/01336, Jun. 25, 1993, abandoned.

[30] Foreign Application Priority Data

Jun. 26, 1992 [GB] United Kingdom ............ 9213621

[51] Int. Cl.$^6$ ............ A01G 31/00; A01B 79/00; A01C 1/00; C08J 9/00
[52] U.S. Cl. ............ 47/58; 521/50; 47/64; 260/29.2
[58] Field of Search ............ 47/58, 64; 71/1, 71/29, 34, 50, 53, 63, 64; 521/50; 260/29.2

[56] References Cited

U.S. PATENT DOCUMENTS

| | | | |
|---|---|---|---|
| 2,965,584 | 12/1960 | Elkin | 47/64 X |
| 3,608,238 | 9/1971 | Reuter et al. | 47/59 |
| 3,805,532 | 4/1974 | Kistner | 47/59 X |
| 3,812,619 | 5/1974 | Wood et al. | 47/59 X |
| 3,877,172 | 4/1975 | Schwab et al. | 47/64 |
| 3,961,445 | 6/1976 | Rack | 47/64 |
| 3,979,198 | 9/1976 | Bardsley | 71/1 |
| 4,118,354 | 10/1978 | Harada et al. | 260/29.2 |
| 4,175,355 | 11/1979 | Dedolph | 47/64 |
| 4,241,537 | 12/1980 | Wood | 47/64 |

FOREIGN PATENT DOCUMENTS

| | | | |
|---|---|---|---|
| 722589 | 11/1965 | Canada | 47/59 |
| 0156786 | 7/1986 | European Pat. Off. . | |
| 0 351 241 | 1/1990 | European Pat. Off. . | |
| 0351241 | 1/1990 | European Pat. Off. . | |
| 0 365 096 | 4/1990 | European Pat. Off. . | |
| 0365096 | 4/1990 | European Pat. Off. . | |
| 2171083 | 9/1973 | France . | |
| 61-234718 | 10/1986 | Japan | 417/64 |
| 13 20 937 | 12/1989 | Japan . | |
| 320937 | 12/1989 | Japan . | |
| 9001705 | 2/1992 | Netherlands . | |
| 1466712 | 3/1977 | United Kingdom . | |
| 89/11787 | 12/1989 | WIPO . | |
| WO 89/11787 | 12/1989 | WIPO . | |

OTHER PUBLICATIONS

Johnson, P.C.; Isocyanate Reactions: Nature, Control and Significance in Manufacture of Polyurethanes; Advances in Polyurethane Technology; pp. 1, 7–8, 137–140, 151–153, 178–186, 196–197, 270–286; 1968.

*Primary Examiner*—David T. Fox
*Assistant Examiner*—Kent L. Bell
*Attorney, Agent, or Firm*—Bell Seltzer Intellectual Property Law Group of Alston & Bird LLP

[57] ABSTRACT a porous solid material for plant propagation which includes granules of a porous expanded mineral, such as perlite or vermiculite, distributed within a porous, open-cell foamed hydrophilic water-retentive polyurethane matrix. The material may be molded into sheets of break-off units for seed germination and propagation.

11 Claims, No Drawings

POROUS SOLID MATERIAL

This application is a continuation of application Ser. No. 08/736,026, filed Oct. 23, 1996, now abandoned, which is a continuation of application Ser. No. 08/356,279, filed Feb. 15, 1995, now abandoned, which is a 371 of PCT/GB93/01336.

TECHNICAL FIELD

The present invention relates to a porous solid material for the propagation and growth of plants.

BACKGROUND OF THE INVENTION

Intensive horticulture uses a wide range of materials for propagation (i.e. early growth) and production of crop plants. All suitable materials must provide appropriate physical conditions for plant growth. Some materials provide some or all of the nutrients required by growing plants, e.g. soil. However, others do not, and where no nutrients are available these have to be independently supplied. The use of an inert substrate with provision of externally supplied nutrients is the basis of hydroponic plant growth techniques.

A number of hydroponic substrates are available. The most widely used material is generically known as Rockwool which is in the form of a mineral fibre batt or slab. The material is water-absorbing. However, being fibrous in nature and due to the manufacturing methods used, it typically has a specific grain along the length of the fibres; unless used as loose fibres.

Other materials are available and these include organic materials, such as wood fibre, as well as inorganic materials, such as perlite. Perlite is a porous expanded mineral material made by crushing silicaceous rock and subjecting it to high temperatures to produce a mineral foam.

Whilst Perlite is in many ways a suitable material for hydroponic culture, its commercial use is restricted because of the unavailability of compact integral forms of the granular material, in which young plants can be readily propagate, unit they reach a stage in which they can be successfully transplanted into the loose granular Perlite material. Such compact propagating materials also require to be physically and chemically compatible with the Perlite granules.

Such compact materials should ideally be available in the form of blocks or moulded units. In order to be suitable plant propagation materials, the material should be porous to air and water, so as to allow the root structure to develop. The material should also be water-retentive so that the young plants do not dry out and can be readily provided with a source of nutrient solution.

It is an object of the present invention to provide a material which seeks to achieve these objects, at least in part.

Published Japanese patent specification JP1320937 (880154653) discloses the production of a material for a bed for raising seedlings which has water absorbing properties yet does not float in water. This is achieved by combining an open-cell polyurethane foam with an inorganic powder such as sand or vermiculite having a true density greater than or equal to 2.0 g/cm$^3$.

SUMMARY OF THE INVENTION

The present invention provides a porous solid material for the propagation of plants which comprises:
granules of a porous expanded mineral;
the granules being distributed within a porous open cell foamed hydrophilic water-retentive hydrogel plastics material matrix.

The porous expanded mineral material is preferably Perlite but in principle other such materials (e.g. vermiculite) may also be employed. Usually, the expanded mineral material constitutes 10 to 50% by weight, preferably 25 to 30% by weight of the total weight of the porous solid material. The granules generally have a particle size less than 6 mm, typically 0.2 to 1.5 mm, although a range of sizes will usually be included. Typically, the porous expanded mineral will desirably have a bulk density in the range 50 to 150 kg/m$^3$ though densities outside these ranges are still useful.

The porous open cell foamed hydrogel plastics material which forms the matrix for the porous solid material is usually a foamed polyurethane material. Suitable compositions are disclosed in our international publication WO89/11787. Usually, a polyisocyante is reacted in-situ or prereacted to a "prepolymer" with a polyethylene oxide derivative having alcohol, amine or isocyanate end groups in the presence of water. Optionally, a poly functional alcohol or amine may be included. In order to modify the reaction time, an inert solvent such as acetone, ethyl acetate or diethylene glycol may be added, usually in an amount of 2 to 7% by weight in order to slow down the reaction. The reaction liberates carbon dioxide which results in a foam structure. The foaming effect may be augmented by the inclusion of an inert volatile solvent, such as pentane or a conventional halogenated blowing agent, which becomes volatilised due to the heat of reaction. Foaming may also be augmented physically by whipping gas into the reacting polymer mixture.

Surface active agents are not essential in the reaction mixture but may optionally be incorporated to modify the foam cell size and structure. Normally these tend to create closed cell foams through in certain cases a mixture of open cells and closed cells may be formed. Conventional polymer additives can be incorporated into the formulation. These include pigments, anti-oxidants, U.V. stabilisers and fillers, such as calcium carbonate. The material may be biodegradable or non-biodegradable. In the present invention, expansion continues until a predominantly open cell structure is obtained. Such open cell structure is required for the porosity of the matrix material. Structure is such that fertilizers, pesticides and plant grown regulants/hormones may be readily introduced to the material during or after manufacture.

The porous solid material is obtained in the form of a solid block. The material may be moulded prior to setting of the plastics material. The reaction times will generally be modified by the skilled man in order to provide an appropriate set time.

The density of the porous solid material is usually in the range 0.1 to 0.5 g/ml. The porous solid material preferably has a water uptake of 50–350% w/w and most preferably 50–85% by volume. Easily available water at 10 cm tension is typically, but not exclusively in the range 20–30% vol/vol. Air capacity of the material, when dry, is a function of formulation and is typically in the range 50–98%. Moisture tension is also a function of formulation and is generally in the range 10–100 cm (1.0–2.0 pF).

Usually the porous solid material is pliant when wet but hard when dry. For commercial usage, the material may be cut to size or moulded into a sheet of break-off units, each optionally having a depression for receiving a plant seed therein.

Growing trials on the material of the present invention show that the optimised materials have good porosity to air and water, whilst being water-retentive. The porosity of the structure allows good root growth throughout the material.

The material of the present invention may also find other uses, such as for pet litter and for producing imitation rock formations in landscape gardening.

DESCRIPTION OF THE PREFERRED EMBODIMENTS

Embodiments of the present invention will now be described by way of example only.

EXAMPLE 1 (preparation)

A series of polyurethane/Perlite foam mixes were prepared to find suitable compositions for seedling growth trials. The following materials were used:

Polyethylene glycol (PEG) molecular weights 8450 (measured) and 8000 (nominal) sold as PEG 8000;

Diphenylmethane-4,4'di-isocyanate (crude MDI)-isocyanate functionality approx 2.5 per molecule; and Perlite, coarse and particle size up to 1.5 mm (60–70 kg/m$^3$) or fine (105–125 kg/m$^3$)

Undried PEG was melted in an oven set at 95° C. (80° C. for samples G, H and I). Additional double distilled water for the reaction as indicated was added. The perlite was then mixed in by adding small quantities at a time to ensure even mixing.

The crude MDI in early batches was added by weight difference from a beaker but in batch P a stepper pipette was used as much smaller quantities were required. This ensured the reproducibility of additions.

When the crude MDI is added to this highly viscous mixture it sinks to the bottom and at first stirring is very difficult. After about ten seconds the mixture froths and mixing becomes easy. The polymer without added solvent, may gel within one minute so pouring it into moulds is not practical for the samples made with the fine perlite. The coarse perlite samples took rather longer to gel/ approximately 30 minutes.

Once reacted, the fine perlite samples could be taken out of the oven and sliced to the required shape as the polymer is quite spongy at this stage and is easy to slice. After curing for 4 hours the polymer is taken out of the oven and allowed to cool to room temperature. After cooling, hand slicing the polymer is quite difficult in the case of the fine perlite samples and very difficult (requiring a hacksaw) for the coarse perlite samples.

Batches G, H and I were all carried out with the oven temperature reduced to 80° C. to slow down the reaction to enable the polymerising mixture to be poured into moulds.

Properties of the materials are given in Table 1.

Seedlings will grow in coarse perlite but the perlite breaks up. Perlite bound into the polyurethane hydrogel foam holds its shape and the foam itself retains water within the structure to keep the seedlings moist.

TABLE 1

SUMMARY OF MIXES
PERCENTAGE OF TOTAL MIX w/w

| | PEG (%) | MDI (%) | PER-LITE (%) | | H2O (%) | WATER** UPTAKE (pph) | COMMENTS |
|---|---|---|---|---|---|---|---|
| TEST 1 | 78.0 | 6.0 | 15.6 | f | 0.4 | nd | light and fluffy |
| TEST 2 | 63.2 | 4.9 | 31.6 | f | 0.3 | nd | limited setting |
| TEST 3 | 63.0 | 4.9 | 31.5 | f | 0.6 | nd | limited foaming |

TABLE 1-continued

SUMMARY OF MIXES
PERCENTAGE OF TOTAL MIX w/w

| | PEG (%) | MDI (%) | PER-LITE (%) | | H2O (%) | WATER** UPTAKE (pph) | COMMENTS |
|---|---|---|---|---|---|---|---|
| 2 | | | | | | | (excess water) |
| A | 62.1 | 6.5 | 31.1 | f | 0.3 | 102 | good foam; fast gel time. |
| B | 63.5 | 10.7 | 25.5 | f | 0.3 | 204 | satisfactory |
| C(1) | 62.5 | 6.1 | 31.3 | c | 0.16 | nd ) | gel times very |
| (2) | 68.1 | 6.2 | 25.5 | c | 0.2 | nd ) | slow; limited |
| (3) | 74.4 | 6.7 | 18.7 | c | 0.2 | nd ) | polymerisation |
| D | 70.7 | 7.8 | 21.2 | c | 0.3 | nd | 20 mins to gel, |
| E | 67.3 | 12.0 | 20.2 | c | 0.4 | nd | high swelling. |
| F | 68.3 | 10.6 | 20.5 | c | 0.5 | nd | 45 mins. to gel |
| G | 65.2 | 8.5 | 26.0 | c | 0.3 | 322 | 30 mins. to gel |
| H | 60.5 | 8.9 | 30.3 | f | 0.3 | 64 | 1 min. to gel |
| I(1) | 60.6 | 6.9 | 30.3 | f | 0.3 | 134 | flakey |
| (2) | 64.5 | 9.4 | 25.8 | f | 0.2 | 171 | mixing not uniform |
| (3) | 68.9 | 10.1 | 20.7 | f | 0.3 | 198 | good mixing |
| (4) | 71.4 | 10.4 | 17.8 | f | 0.36 | 233 | satisfactory |
| (5) | 59.9 | 9.8 | 29.9 | f | 0.4 | 255 | satisfactory |
| (6) | 63.7 | 10.4 | 25.5 | f | 0.4 | 255 | good uniform mix |
| (7) | 68.0 | 11.1 | 20.4 | f | 0.45 | 251 | satisfactory |
| (8) | 70.6 | 11.6 | 17.4 | f | 0.47 | 291 | easily broken |

** After prolonged washing immersed in water the sample was left to drip dry for five minutes and weighed.
c = coarse
f = fine
nd = not measured.

EXAMPLE 2 (Swelling of Polymers A, B and I)

A cube of side approximately 4 cm was cut from each composition giving a volume of about 64 cm$^3$. Swelling and other measurements were as follows:

TABLE 2

| | | A | B |
|---|---|---|---|
| Initial weight | (g) | 24.7 | 10.9 |
| Density | (g/cm$^3$) | 0.386 | 0.170 |
| Swollen weight at 3 days | (g) | 50.0 | 33.2 |
| Water Uptake | (g) | 25.3 | 22.3 |
| Water Uptake | (pph) | 102 | 204 |
| Dried weight after 4 days | (g) | 11.3 | |
| Weight loss* | (g) | 13.4 | 6.6 |
| Weight loss | (%) | 54 | 60 |

*Swelling solution was taken and dried down and the weight of recovered material was almost the same as the calculated weight loss.

Swelling solution was taken and dried down and the weight of recovered material was almost the same as the calculated weight loss.

Water uptake is indicated in grams and parts per hundred (pph).

Polymer I was also studied in greater detail and weight losses after swelling were similar to those reported in A and B. The weight losses ranged from 48–78% of the initial weight.

EXAMPLE 3 (Growing trials)

a range of commercially available materials typically used for plant propagation were compared to the invention (mix B in Table 1).

Separate constituent materials, namely, perlite and polymer, were each employed as propagation media.

Similarly, comparative samples of rockwool fibre (Grodania A/S) with a vertical grain (RW(V)), with a horizontal grain (RW(H)) and woodfibre (Hortifibre) were also tested.

Replicates of each material, of nominal size 3.0 mm×3.0 cm×4.5 cm (hxwxd), were placed into plastic cellular propagation carry-trays and wetted with a standard complete-nutrient solution, shown in Table A.

TABLE A

Solution components as equal volumes of stock-liquids A and B for liquid feeding of plants.

| Component | Mass(gl$^{-1}$) | Total element concentration (ppm) when diluted 1:100 | |
|---|---|---|---|
| Solution A | | | |
| Calcium nitrate | 40 | Ca 68 | NO$_3$-N 47 |
| Solution B | | | |
| Potassium nitrate | 59 | K 224 | NO$_3$-N 77 |
| Mono-amm. phosphate | 14 | NH$_4$-N 17 | P38 |
| Magnesium sulphate | 19 | Mg 19 | |
| Iron EDTA | 1.78 | Fe 2.4 | |
| Manganese sulphate | 0.31 | Mn 0.76 | |
| Borax | 0.21 | B 0.27 | |
| Ammonium molybdate | 0.012 | Mo 0.05 | |

Seed of Chinese cabbage cv. Tip Top (*Brassica campestris* ssp. pekinensis Rupr.) was sown by hand into depressions in the top of each piece of material on Jan. 30th 1992. All were covered with black polythene film. Trays were incubated in a glasshouse at 18° C. thermostat setting, with sub-heating at 20° C.

Samples were assessed for chitting and subsequent germination of seed on each of the substrates. Results are shown in Table B.

TABLE B

Germination of Chinese cabbage 4 days after sowing.

| Media | % Germination/emergence |
|---|---|
| Invention | 100 ± 0 |
| Perlite | 100 ± 0 |
| Hydrogel | 98.1 ± 0.17 |
| RW(V) | 92.6 ± 0.50 |
| RW(H) | 87.0 ± 0.48 |
| Woodfibre | 96.3 ± 0.21 |

Plants were destructively harvested and assessed for leaf size and quality, leaf number, fresh weight and dry weight after 43 days, at which point they would normally have been planted-on into final media for growing to maturity.

Results are shown in Table C.

TABLE C

Plant data at typical planting-on stage.

| Media | Mean leaf number | Mean primary leaf area | Total mean fresh weight | Total mean dry weight (g) | Fr.wt: Dr.wt (g)ratio |
|---|---|---|---|---|---|
| Invention | 8.4 | 352 | 7.80 | 0.73 | 10.7:1 |
| Perlite | 8.4 | 336 | 10.39 | 0.66 | 15.6:1 |
| Hydrogel | 8.0 | 280 | 9.75 | 0.66 | 14.9:1 |
| RW(V) | 7.8 | 405 | 8.99 | 0.55 | 16.4:1 |
| RW(H) | 8.2 | 551 | 12.49 | 0.68 | 18.4:1 |
| Woodfibre | 6.6 | 311 | 5.77 | 0.33 | 17.7:1 |

Conclusions

Seed sown onto samples of the invention rapidly achieved maximum germination. Perlite-sown seed performed equally well although other media tested did not.

The invention produced plant growth with the greatest number of expanded leaves at the time of examination. Performance for this parameter was matched by perlite-grown plants. Variability in leaf number for the invention (8.4±0.21) was also lower than for other substrates, (perlite 8.4±0.46, hydrogel 8.0±0.49). This indicates improved uniformity of growth when using the invention in comparison to either of the constituents alone. Comparative leaf area was greater than for either of the two constituent components alone.

while fresh weight was not the greatest of the materials tested, when examined in the context of dry weight, typically seen as a more accurate measure of plant assimilation rate, the invention performed better than any of the other materials tested. This is reflected in a relatively low fresh weight:dry weight ratio, implying a greater assimilation rate for plants grown using the invention as substrate.

Plant quality was assessed subjectively. Plants grown using the invention were uniformly compact and easy to handle. The new material itself was uniquely easy to handle and retained its structure well, despite its soft-when-wet/ rigid-when-dry nature. This was in contrast to granular perlite, granular hydrogel, fibrous woodfibre and horizontal-grain rockwool, which each tended to separate. Vertical-grain rockwool remained intact. However, observations showed that root structure was different in each of the growing media. It was particularly good in the new material. The unusual open structure, lacking in grain, afforded excellent root development in all directions, resulting in maximum colonisation and therefore access to nutrients and water within the medium.

We claim:

1. A method of preparing a porous solid material for the propagation of plants consisting of a single step of reacting a polyisocyanate and a polyethylene oxide derivative in the presence of granules of a porous expanded mineral and in the presence of 0.5 weight % water or less to produce a substantially dry, solid porous open-cell foamed hydrophilic water-retentive polyurethane hydrogel material matrix, which is substantially rigid in said dry condition and which is capable of absorbing water and becoming pliant when wet, said plant propagation material having granules of a porous expanded mineral distributed throughout said polyurethane hydrogel material matrix.

2. The method according to claim 1 wherein said step of reacting comprises reacting a polyisocyanate and a polyethylene oxide derivative in the presence of granules of a porous expanded mineral having a particle size of 0.2 to 1.5 mm.

3. The method according to claim 1 wherein said step of reacting comprises reacting a polyisocyanate and a polyethylene oxide derivative in the presence of granules of a porous expanded mineral having a bulk density in the range of 50 to 150 kg/m$^3$.

4. A method according to claim 1 wherein the porous expanded material is perlite or vermiculite.

5. The method according to claim 1 wherein said step of reacting comprises reacting 60–70 weight % polyethylene glycol, 8–12 weight % diphenylmethane-4,4'-diisocyanate and 20–30 weight % perlite.

6. The method according to claim 1 further comprising the step of molding the prepared porous solid material into a sheet of separatable plant growing units.

7. The method according to claim 6 wherein said step of molding comprises molding a sheet of separatable plant growing units wherein each unit has a depression for receiving a plant seed.

8. The method according to claim 1 wherein said reacting step further comprises an inert volatile solvent which becomes volatized during said reacting step.

9. The method according to claim 1 wherein said reacting step further comprises an inert solvent in an amount of 2–7% by weight in order to slow down said reacting step.

10. The method according to claim 1 wherein said reacting step further comprises at least one additive selected from the group consisting of pigments, antioxidants, UV stabilizers and fillers.

11. The method according to claim 1 wherein said step of reacting comprises reacting a polyisocyanate and a polyethylene oxide derivative in the presence of a sufficient amount of a porous expanded mineral to produce a porous solid material comprising 10 to 50% by weight of the porous expanded mineral.

* * * * *